(12) United States Patent
Nunan

(10) Patent No.: US 7,875,250 B2
(45) Date of Patent: Jan. 25, 2011

(54) EXHAUST TREATMENT DEVICE, AND METHODS OF MAKING THE SAME

(75) Inventor: John G. Nunan, Tulsa, OK (US)

(73) Assignee: Umicore AG & Co. KG, Hanau (DE)

( * ) Notice: Subject to any disclaimer, the term of this patent is extended or adjusted under 35 U.S.C. 154(b) by 1020 days.

(21) Appl. No.: 10/734,014

(22) Filed: Dec. 11, 2003

(65) Prior Publication Data

US 2005/0129588 A1   Jun. 16, 2005

(51) Int. Cl.
  *B01D 50/00* (2006.01)
  *B01D 53/34* (2006.01)
  *B01J 23/00* (2006.01)
  *B01J 23/10* (2006.01)
  *B01J 23/44* (2006.01)
  *B01J 23/42* (2006.01)

(52) U.S. Cl. .................. 422/177; 422/168; 502/302; 502/304; 502/333; 502/339

(58) Field of Classification Search ............... 422/177; 502/302, 304, 349, 355
See application file for complete search history.

(56) References Cited

U.S. PATENT DOCUMENTS

| | | | | |
|---|---|---|---|---|
| 4,239,656 A | * | 12/1980 | Fujitani et al. | 502/200 |
| 5,857,140 A | * | 1/1999 | Foster | 422/179 |
| 5,981,427 A | * | 11/1999 | Sung et al. | 502/325 |
| 6,034,031 A | | 3/2000 | Sata | 502/333 |
| 6,335,305 B1 | * | 1/2002 | Suzuki et al. | 502/325 |
| 6,387,338 B1 | | 5/2002 | Anatoly et al. | 423/239.1 |

FOREIGN PATENT DOCUMENTS

| EP | 0 337 809 A2 | 4/1989 |
|---|---|---|
| EP | 0 637 461 A1 | 8/1993 |

OTHER PUBLICATIONS

"Impact of Pt-Rh and Pd-Rh Interactions on Performance of Bimetal Catalysts", J.C. Nunan, et al., SAE Technical Paper Series, 950258; Internation Congress and Exposition, Detroit, MI, Feb. 27-Mar. 2, 1995, 9 pages.
WO 03/074172 A1 International Publication.

* cited by examiner

*Primary Examiner*—Alexa D Neckel
*Assistant Examiner*—Matthew J Merkling
(74) *Attorney, Agent, or Firm*—Smith, Gambrell & Russell, LLP

(57) ABSTRACT

An exhaust treatment device, comprises a substrate; a catalyst layer deposited on the substrate, the catalyst layer comprising a first catalyst metal and a second catalyst metal, wherein greater than or equal to about 70 wt % of the first catalyst metal and the second catalyst metal is non-alloyed under alloying conditions, wherein the weight percent is based on a combined weight of the first catalyst metal and the second catalyst metal. The first catalyst metal and the second catalyst metal are different and may be individually selected from the group consisting of platinum, palladium, rhodium, rhenium, iridium, ruthenium, and osmium.

19 Claims, 6 Drawing Sheets

US 7,875,250 B2

EXHAUST TREATMENT DEVICE, AND METHODS OF MAKING THE SAME

BACKGROUND

Exhaust emission control devices may comprise catalytic converters, evaporative emissions devices, scrubbing devices (e.g., hydrocarbon, sulfur, and the like), particulate filters, traps, absorbers, absorbers, reactors (e.g., non-thermal plasma reactors, and the like), and the like, as well as combinations comprising at least one of the foregoing devices. One function of these devices is to treat an exhaust stream, thereby reducing the concentration of at least one component in the exhaust stream. Such devices may be rated in terms of their performance, wherein the performance of an exhaust emission control device represents a measure of the ability of that device to reduce the concentration of a component(s) in a stream under various conditions.

Catalytic converters are one type of an exhaust emission control device, and comprise one or more catalytic materials deposited on a substrate. The composition of the catalytic materials, the composition of the substrate, and the method by which the catalytic material is deposited on the substrate serve as one way in which catalytic converters are differentiated from one another. Methods of depositing catalytic materials onto a substrate include washcoating, imbibing, impregnating, physisorbing, chemisorbing, precipitating, and combinations comprising at least one of the foregoing deposition methods.

Washcoating includes contacting an admixture of various components of a catalyst with a substrate such that a layer is deposited on and/or in the substrate. The term washcoat as used herein describes the layer or layers of the catalytically active admixture deposited on the substrate. In a three-way conversion catalyst, the washcoat may comprise a metal component, an aluminum oxide component, and an oxygen storage (OS) component. Stabilizers, promoters, binders, hydrogen sulfide control agents, and the like may also be present in a washcoat. Furthermore, the washcoat comprises layers of material.

These catalyst designs, the metal components, e.g., platinum group metals, are separated from each other in different catalyst layers and each layer in turn comprises support components that are optimized for the individual platinum group metals. For 2-layer designs, platinum (Pt) or palladium (Pd) may be located in the first layer in physical communication with the substrate (e.g., cordierite), while rhodium (Rh) is located in the top layer in physical communication with the exhaust stream. Generally, these 2-layer catalyst designs have the distinct disadvantage of being complex and are associated with a significant increase in manufacturing complexity and cost.

Therefore, what is need in the art is a 1-layer catalyst design with the performance of a 2-layer catalyst design.

SUMMARY

One embodiment of an exhaust treatment device, comprises a substrate; a catalyst layer deposited on the substrate, the catalyst layer comprising a first catalyst metal and a second catalyst metal, wherein greater than or equal to about 70 wt % of the first catalyst metal and the second catalyst metal is non-alloyed under alloying conditions, wherein the weight percent is based on a combined weight of the first catalyst metal and the second catalyst metal. The first catalyst metal and the second catalyst metal are different and may be individually selected from the group consisting of platinum, palladium, rhodium, rhenium, iridium, ruthenium, and osmium.

Another embodiment of an exhaust treatment device, comprises a substrate; a catalyst layer deposited on the substrate, the catalyst layer comprising palladium, rhodium, an aluminum oxide, and an oxygen storage component, wherein the aluminum oxide and the storage component have average pore diameters of about 150 angstroms to about 1,000 angstroms, wherein about 50% to about 80% of the pore volume, based on the total pore volume comprise pores having average pore diameters of about 180 angstroms to about 800 angstroms, wherein greater than or equal to about 70 wt % of the palladium and rhodium is non-alloyed under alloying conditions, wherein the weight percent is based on a combined weight of the palladium and the rhodium; a retention material disposed around the substrate to form a subassembly; and a housing disposed around the subassembly.

One embodiment of a method of making an exhaust emission control device, the method comprises mixing a palladium salt, a rhodium salt, an aluminum oxide, and an oxygen storage component together to form a slurry; depositing the slurry on a substrate to form a washcoat; calcining the washcoat plus substrate to form a catalyst layer on the substrate, wherein greater than or equal to about 70 wt % of the palladium and rhodium in the catalyst layer is non-alloyed under alloying conditions, wherein the weight percent is based on a total weight of the palladium and rhodium in the catalyst; and disposing the calcined substrate in a housing.

The above-described and other features will be appreciated and understood by those skilled in the art from the following detailed description, drawings, and appended claims.

BRIEF DESCRIPTION OF THE DRAWINGS

Refer now to the figures, which are exemplary embodiments, and wherein the like elements are numbered alike.

DETAILED DESCRIPTION

It is noted that although the present catalyst is described in relation to a catalyst comprising Pd and Rh combinations for convenience, it is not intended to be limited thereto. The same washcoat materials are believed to inhibit alloying between various other catalyst metals that typically alloy under the alloying conditions described herein (e.g., Pt—Rh, Pt—Pd, Pt—Rh—Pd, Pd—Cu, etc.). Some possible catalyst metals include platinum group metal(s), as well as other metals, e.g., copper, and the like. These catalysts have similar non-alloying characteristics as described for Pd and Rh.

Figure 1:
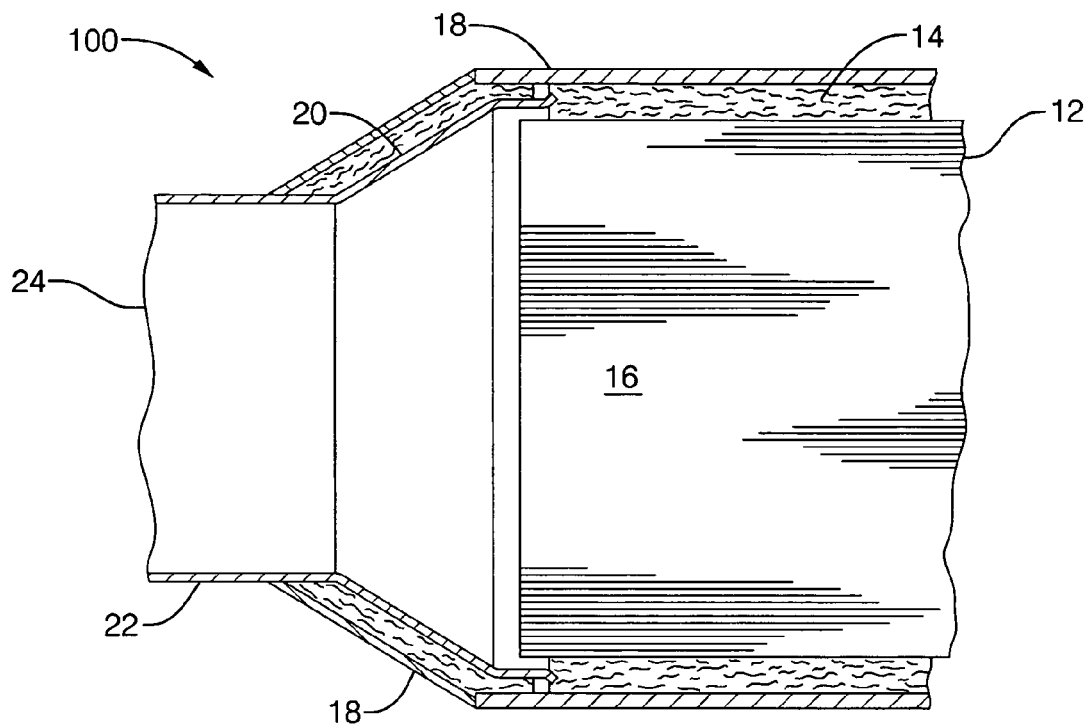
FIG. 1 is a partial cross-sectional view of an exemplary exhaust treatment device.

Referring now to FIG. 1, an exemplary embodiment of an exhaust emission control device generally designated 100 is illustrated. This exhaust emission control device 100 comprises a substrate 12 located within a retention material 14 forming a subassembly 16. A shell 18 is disposed around the subassembly 16. An end-cone 20 comprising a snorkel 22 having an opening 24 is in physical communication with shell 18. Opening 24 allows exhaust fluid communication with substrate 12. As will be discussed in much greater detail, a catalyst may be deposited on/throughout substrate 12.

Substrate 12 may comprise any material designed for use in a spark ignition or diesel engine environment and having the following characteristics: (1) capable of operating at temperatures up to about 600° C., and up to about 1,100° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst. Some possible materials include cordierite, silicon carbide, metal, metal oxides (e.g., alumina, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials may be in the form of foils, perform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms, e.g., metallic foils, open pore alumina sponges, and porous ultra-low expansion glasses. Furthermore, these substrates may be coated with oxides and/or hexaaluminates, such as stainless steel foil coated with a hexaluminate scale.

Although the substrate may have any size or geometry, the size and geometry are preferably chosen to optimize surface area in the given exhaust emission control device design parameters. For example, the substrate may have a honeycomb geometry, with the combs through-channel having any multi-sided or rounded shape, with substantially square, triangular, pentagonal, hexagonal, heptagonal, octagonal, or similar geometries preferred due to ease of manufacturing and increased surface area.

Located between the substrate 12 and the shell 18 may be a retention material 14 that insulates the shell 18 from both the exhaust fluid temperatures and the exothermic catalytic reaction occurring within the catalyst substrate 12. The retention material 14, which enhances the structural integrity of the substrate by applying compressive radial forces about it, reducing its axial movement and retaining it in place, may be concentrically disposed around the substrate to form a retention material/substrate subassembly 16.

The retention material 14, which may be in the form of a mat, particulates, or the like, may be an intumescent material (e.g., a material that comprises vermiculite component, i.e., a component that expands upon the application of heat), a non-intumescent material, or a combination thereof. These materials may comprise ceramic materials (e.g., ceramic fibers) and other materials such as organic and inorganic binders and the like, or combinations comprising at least one of the foregoing materials. Non-intumescent materials include materials such as those sold under the trademarks "NEXTEL" and "INTERAM 1101HT" by the "3M" Company, Minneapolis, Minn., or those sold under the trademark, "FIBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

The retention material/substrate subassembly 16 may be concentrically disposed within a shell 18. The choice of material for the shell 18 depends upon the type of exhaust fluid, the maximum temperature reached by the substrate 12, the maximum temperature of the exhaust fluid stream, and the like. Suitable materials for the shell 18 may comprise any material that is capable of resisting under-car salt, temperature, and corrosion. For example, ferrous materials may be employed such as ferritic stainless steels. Ferritic stainless steels may include stainless steels such as, e.g., the 400—Series such as SS-409, SS-439, and SS-441, with grade SS-409 generally preferred.

End cone 20 (or alternatively an end cone(s), end plate(s), exhaust manifold cover(s), and the like), which may comprise similar materials as the shell, may be disposed at one or both ends of the shell. The end cone 20 (end plate or the like) is sealed to the shell to prevent leakage at the interface thereof. These components may be formed separately (e.g., molded or the like), or may be formed integrally with the housing using methods such as, e.g., a spin forming, or the like.

In an alternative method, for example, the shell may comprise two half shell components, also known as clamshells. The two half shell components are compressed together about the retention material/substrate subassembly, such that an annular gap preferably forms between the substrate and the interior surface of each half shell as the retention material becomes compressed about the substrate.

The exhaust emission control device 100 may be manufactured by one or more techniques, and, likewise, the retention material/substrate subassembly 16 may be disposed within the shell 18 using one or more methods. For example, the retention material/substrate subassembly 16 may be inserted into a variety of shells 18 using a stuffing cone. The stuffing cone is a device that compresses the retention material 14 concentrically about the substrate 12. The stuffing cone then stuffs the compressed retention material/substrate subassembly 16 into the shell, such that an annular gap preferably forms between the substrate 12 and the interior surface of the shell 18 as the retention material 14 becomes compressed about the substrate 12. Alternatively, if the retention material 14 is in the form of particles (e.g., pellets, spheres, irregular objects, or the like) the substrate 12 may be stuffed into the shell 18 and the retention material may be disposed in the shell 18 between the substrate 12 and the shell 18.

As briefly mentioned above, a catalyst may be deposited on and/or throughout (hereinafter "on") the substrate 12. The term "catalyst" as used herein generally refers to a catalyst material and additional support materials that form a coating on the substrate, e.g., a washcoat. Preferably, the catalyst(s) comprises palladium (Pd) and rhodium (Rh) in a single layer catalyst, wherein palladium and rhodium are separate elements; they are not alloyed. In other words, greater than or equal to 70 wt % of the palladium and rhodium are non-alloyed, with greater than or equal to about 80% of the palladium and rhodium non-alloyed preferred, greater than or equal to about 90% of the palladium and rhodium non-alloyed preferred, greater than or equal to about 95 wt % of the palladium and rhodium non-alloyed even more preferred, and none of the palladium and rhodium alloyed most preferred, when exposed to alloying conditions (e.g., a temperature of greater than or equal to about 300° C. in a stoichiometric or reducing environment for 30 minutes). Reducing environments are exhaust gas compositions that comprise an excess of reductants such as hydrogen ($H_2$), hydrocarbons (HCs), ammonia ($NH_3$), hydrogen sulfide ($H_2S$), and/or carbon monoxide (CO) over oxidants such as oxygen ($O_2$) and oxides of nitrogen ($NO_x$). The term "alloy" is used herein to generally describe a homogenous mixture or solid solution of two or more metals, wherein the atoms of one metal occupy interstitial positions between the atoms of the other metal. Additionally, all ranges disclosed herein are inclusive and combinable (e.g., the ranges of less than or equal to about 25, with about 5 to about 20 desired, and about 10 to about 15 more desired, includes the ranges of about 10 to about 25, about 5 to about 15, etc.).

Generally, the palladium is preferred for its activity in carbon monoxide (CO) oxidation and hydrocarbon oxidation reactions, while the rhodium is preferred for nitrogen oxides reduction. The catalyst comprises palladium and rhodium in a single layer (although additional catalyst metals may also be included), wherein the two platinum group metals do not form an alloy. As such, the catalyst performance is preferably greater than or equal to the 2-layer catalyst designs where the palladium and rhodium were separated into different layers to prevent the alloying that inhibits the rhodium catalytic activity. The term "performance" is used generally to describe a measure of the ability of a catalyst to reduce the concentration of a component(s) in a stream under various conditions. For example, performance data may include, but is not limited to, the light-off temperature. This 1-layer catalyst has the advantage of a more simple catalyst design compared to the 2-layer catalyst. Performance advantages may further be achieved as the Pd is now in closer proximity to the exhaust stream to be treated as compared to its location in a 2-layer system. In the 2-layer design the Pd is separated from direct contact with the exhaust gas by the Rh layer. Thus, a 1-layer Pd/Rh technology has the advantage of bringing both precious metals in close proximity to the exhaust stream to be treated. Accordingly, a reduction in manufacturing cost of the catalyst may be realized compared to 2-layer designs as well as potential performance advantages.

Generally, palladium-rhodium interaction, e.g., alloy formation, results in a negative impact on catalyst performance. More particularly, palladium and rhodium readily form alloys when present together in the same washcoat layer, particularly in a reducing environment. The resultant palladium/rhodium alloy surfaces are believed to be palladium-rich, which results in loss of the rhodium function of the catalyst. As such, palladium/rhodium catalysts used in for example three-way conversion (TWC) catalysts have been multi-layered for optimum performance. This design results in significantly increased costs in catalyst manufacture. Further, for optimum performance for palladium/rhodium technologies design strategies have favored different oxygen storage (OS) materials and aluminas for both the palladium and the rhodium layers, which further adds to the cost and complexity of catalyst manufacture. Unlike these 2-layer catalyst designs, the catalyst disclosed herein is a single layer catalyst capable of preventing palladium-rhodium interaction, i.e., preventing alloy formation. As such, the 1-layer catalyst is capable of maintaining both its palladium function and rhodium function.

The catalyst may comprise any ratio of palladium to rhodium that does not induce alloy formation and that is sufficient for the catalyst to function as desired (e.g., depending upon the conditions in which the catalyst will be employed, such as a three-way conversion catalyst). In one embodiment, for example, the weight ratio of palladium to rhodium can be less than or equal to about 20:1 (e.g., about 3:1 to about 20:1), with about 3:1 to about 15:1 desirable, and about 3:1 to about 10:1 generally more desirable.

The catalyst material (e.g., palladium and rhodium) may be combined with additional materials. The additional materials may comprise oxides (e.g., oxides of alumina, zirconia, titania, and the like), hexaaluminates, and the like, and combinations comprising at least one of the foregoing. Where a hexaaluminate is employed, the hexaaluminate preferably comprises a crystalline structure of aluminum, barium, lanthanum and oxygen.

The additional materials may further comprise stabilizing agents, or promoters such as, Group II metals, rare earth metals, Group VIII metals, and the like, as well as their oxides, alloys, solid solutions and combinations comprising at least one of the foregoing. Preferred promoters and stabilizing agents include barium, strontium, lanthanum, praseodymium, manganese, cobalt, and the like, as well as, oxides, alloys, and combinations comprising at least one of the foregoing, with zirconium, barium, lanthanum, and combinations comprising at least one of the foregoing particularly preferred.

Additionally, the catalytic material (e.g., palladium and rhodium) may be loaded onto a support material, wherein the loading is sufficient for the catalytic material to be active for its respective function, e.g., carbon monoxide (CO) oxidation and hydrocarbon oxidation reactions in the case of palladium and nitrogen oxide reduction reactions in the case of rhodium. For example the combined loading of palladium and rhodium can be less than or equal to about 300 grams per cubic foot ($g/ft^3$) (about 10.59 grams per liter (g/l)), with a total loading of about 5 $g/ft^3$ (about 0.18 g/l) to about 300 $g/ft^3$ (about 10.59 g/l) employed, and less than or equal to about 40 $g/ft^3$ (about 1.41 g/l) preferred. The Rh loading can be less than or equal to about 25 $g/ft^3$ (about 0.88 g/l), with about 1 $g/ft^3$ (about 0.035 g/l) to about 25 $g/ft^3$ (about 0.88 g/l) employed, and less than or equal to about 10 $g/ft^3$ (about 0.353 g/l) preferred.

In making the catalyst, selective placement strategies of the palladium/rhodium may be employed in the design of the one layer palladium/rhodium catalyst. However, as will be discussed in greater detail, the catalyst is preferably made without using a selective placement strategy. The term "selective placement" is used herein to generally describe efforts, e.g., chemical fixation, to separate the catalyst metals (e.g., platinum group metals) in order to prevent alloy formation and optimize PGM-promoter interactions. Such selective chemical fixation steps as used in the three-way conversion (TWC) catalyst art, include the addition of specific reagents such as acids and bases during the batching process to fix one of the platinum group metals on a specific support component. For example, one of the platinum group metals (e.g., palladium nitrate) could be first added to a slurry followed by the alumina component. A fixing agent may then be added or an acid/base that selectively deposits/precipitates the palladium nitrate onto the alumina support. In a separate container, the other platinum group metal component (rhodium) is preferably combined with another washcoat component such as the oxygen storage component and then chemically fixed before combining the two slurries.

Alternatively, the platinum group metals could be pre-impregnated onto the different washcoat components. Then, the washcoat components preferably are calcinated, before their addition to the slurry.

For cost, simplicity, and efficiency, however, the catalyst can be made without using a selective placement strategy. In this method, all the washcoat components are added to a liquid to form a slurry (e.g., to water and acid such as acetic, nitric, or formic). The washcoat components are then optionally milled to a specified particle size if desired. The palladium and rhodium salts (nitrates, sulfites, and the like) are then metered into the slurry in no partcular order, with no particular effort being made to fix chemically or otherwise separate the precious metals (e.g., palladium, rhodium, and optionally other precious metals (e.g., platinum and the like)) and support them onto one selective support component over another. In other words, the precious metal precursor is allowed to adsorb at will on whichever support component it prefers, i.e., has the greatest affinity toward. However, it is preferable that all the precious metal is adsorbed such that soluble precious metal species are not present during coating.

Exemplary palladium salts may include, but is not limited to, palladium nitrate, dinitrodiammine palladium nitrate, palladium chloride, and palladium ammine nitrate. Rhodium salts may include, for example, rhodium nitrate, rhodium sulfite, and rhodium chloride solution.

As briefly mentioned above, the washcoat may comprise a platinum group metal and other washcoat components, e.g., an aluminum oxide. This aluminum oxide may have a porosity associated with it. As used herein, porosity is the ratio of the pore volume (i.e., the total volume occupied by the pores in a component) to the total volume occupied by the component. As such, porosity is related to a density of a material. The porosity of a component is also classified according to the size of the individual pores defined within the component. As used herein, pores include openings, passageways, and/or interstices, both within and between the constituent particles of the component, as well as between the individual components included in the catalyst. Since the diameter of a pore may be irregular (e.g., variably and non-uniform), a pore diameter may reflect an average cross-sectional area of a pore, as determined on the surface of the component in which the pore is present. Preferably, the aluminum oxide and/or the oxygen storage materials employed in the washcoat have average pore diameters of about 150 angstroms (Å) to about 1,000 Å and wherein about 50% to about 80% of the pore volume, based on the total pore volume comprise pores having average pore diameters of about 180 Å to about 800 Å. The aluminum oxide component may be any aluminum oxide suitable for use in a catalytic converter (e.g., gamma, delta, theta, and/or alpha aluminum oxide), including stabilized aluminum oxides. If a stabilized aluminum oxide is used, less than or equal to about 40 weight percent (wt %) stabilizer may be employed, based on the total weight of the stabilized aluminum oxide, with about 2 wt % to about 30 wt % stabilizer preferred, and about 4 wt % to about 10 wt % stabilizer more preferred.

The aluminum oxide component may include a lanthanum (La) stabilized gamma aluminum oxide (referred to herein as La γ-aluminum oxide), a theta-aluminum oxide (referred to herein as θ-aluminum oxide), a barium (Ba) stabilized gamma aluminum oxide, (referred to herein as Ba-γ-aluminum oxide), or a combination comprising at least one of the foregoing aluminum oxides.

In addition to the rhodium, palladium, alumina, and an oxygen storage component is preferably employed in the washcoat (and hence in the single layer). The oxygen storage component employed in the washcoat can include cerium (Ce) in a form that exhibits an oxygen storage capability. For example, ceria in a form that is oxidized to $Ce^{4+}$ under lean exhaust gas conditions wherein an excess amount of oxygen is present in the exhaust stream, and that releases oxygen as it is reduced to the $Ce^{3+}$ oxidation state when rich exhaust gas conditions are present. Cerium is preferably used as a solid solution in combination with other materials including, for example, lanthanum (La), praseodymium (Pr), neodymium (Nd), niobium (Nb), platinum (Pt), palladium (Pd), rhodium (Rh), iridium (Ir), osmium (Os), ruthenium (Ru), tantalum (Ta), zirconium (Zr), yttrium (Y), nickel (Ni), manganese (Mn), iron (Fe) copper (Cu), silver (Ag), gold (Au), gadolinium (Gd), and combinations comprising at least one of the foregoing metals. Various oxides (e.g., the metal in combination with oxygen (O)) are preferably used, including, for example, zirconia ($ZrO_2$) titania ($TiO_2$), praseodymia ($Pr_6O_{11}$), yttria ($Y_2O_3$), neodynia ($Nd_2O_3$), lanthana ($La_2O_3$), gadolinium oxide ($Gd_2O_3$), or mixtures comprising at least one of the foregoing.

Preferred oxygen storage components include those represented by the formula ($Ce_aZr_bLa_cY_dPr_eO_x$), wherein subscripts a, b, c, d, and e represent atomic fractions, subject to the proviso that (a+b+c+d+e=1). In addition, the value of "a" may be about 0.01 to about 0.6. Within this range, a value of less than or equal to about 0.5 may be employed, with less than or equal to about 0.4 preferred, and less than or equal to about 0.3 more preferred. Also preferred within this range is a value for "a" of greater than or equal to about 0.1, with greater than or equal to about 0.15 more preferred, and greater than or equal to about 0.20 especially preferred. Also, "b" may be less than or equal to about 0.95, with about 0.40 to about 0.8 preferred; "c" may be less than or equal to about 0.15, with about 0.02 to about 0.1 preferred; "d" may be less than or equal to about 0.15, with about 0.02 to about 0.1 preferred; "e" may be less than or equal to about 0.15, with about 0.02 to about 0.1 preferred; and "x" may be less than or equal to about 2.0. The precise value for "x" depends on the type of metal component, its charge, atomic fraction, and the requirement that the metal oxide have a neutral overall charge. Examples of preferred oxygen storage components include, for example, $Ce_{0.376}Zr_{0.50}La_{0.086}Pr_{0.038}O_{1.95}$, and $Ce_{0.25}Zr_{0.65}La_{0.04}Y_{0.06}O_{1.95}$.

Exemplary oxygen storage components are set forth in U.S. Pat. No. 6,387,338 to Anatoly et al., which is herein incorporated by reference. This patent is directed to thermally stable oxygen ion conducting/oxygen storage components having a stable cubic structure (i.e., after aging at 1,200° C. in air or aging in 5% hydrogen up to 1,000° C., for at least about 24 hours.)

The formation of the catalyst layer, for example, comprises dispersing palladium and rhodium in a slurry comprising water, acid, binder, a promoter/stabilizer such as barium sulfate, an organic reducing agent such as sucrose, a $H_2S$ control agent such as nickel oxide, gamma aluminum oxide, and an oxygen storage component. The slurry can then be applied to a substrate (e.g., a honeycomb cordierite monolith) in one or more passes, preferably in one pass. The application can be accomplished in various manners, such as dipping, spraying, and/or the like. Once applied to the substrate, the coated substrate is calcined at temperatures of about 300° C. to about 600° C. to form the catalyzed substrate with the catalyst layer. This catalyst layer may comprise any thickness sufficient to attain the catalytic activity for the particular use. For example, suffient thickness to be employed in a three-way conversion catalyst. For example, the washcoat can comprise a thickness of about 30 micrometers to about 250 micrometers, with a thickness of about 50 micrometers to about 200 micrometers preferred.

EXAMPLES

Aging and Testing Protocols Used:

The performance of the various catalysts were compared after initial aging protocols to simulate up to 100,000 miles of road aging. The aging protocols used included exposing the catalyst to temperatures less than or equal to about 1,050° C., with temperatures of about 400° C. to 1,050° C. generally employed; and exposing the catalyst to exhaust streams of various compositions. These included: stoichiometric compositions (i.e., an air to fuel ratio (A/F) of about 14.5), compositions with excess oxygen (i.e., so called "lean aging conditions", wherein an air to fuel ratio (A/F) is greater than 14.5), and exhaust gas compositions having stoichiometrically high concentrations of hydrocarbons (HC) and carbon monoxide (CO), (i.e., so called "rich aging conditions", wherein an air to fuel ratio (A/F) is less than 14.5). The catalysts were aged in groups of four wherein the exhaust from the test engine was split evenly between the four examples, thus allowing parallel aging under identical conditions of at least one 2-layer reference and up to three 1-layer test catalysts.

After aging, the catalysts were evaluated on a stand dynamometer for light-off performance and for air to fuel (A/F) traverse activity so as to simulate sudden accelerations and decelerations common in vehicle operation. The light-off performance of the catalysts were summarized as the temperature where 50% conversion of HC, CO, and $NO_X$ to their respective target materials of $H_2O$, $CO_2$, and $N_2$ was obtained, $T_{50\%}$. Thus, lower $T_{50\%}$ represents better performance.

Air to fuel traverse performance was summarized in terms of percent conversion of the exhaust gas stream at stoichiometry (air to fuel ratio of 14.56) or as the integral/stoichiometric performance for A/F ratios integrated between A/F values of about 14.71 to about 14.41.

Finally, performance of the various catalysts is compared using a North American vehicle test method. The results were presented in terms of Bag Tailpipe Emissions, which are reported in terms of grams per mile (g/mile). The North American test method used herein comports with the standard Federal Test Procedures (FTP). The Federal Test Procedure uses a North American vehicle, namely a 3.1 liter (L), V-6 (i.e., a 6-cylinder engine) Chevy Lumina with 1998 Engine Management System (EMS) Calibration.

Catalysts aged using the high temperature (i.e., temperatures of greater than or equal to 700° C.) rich-lean-stoichiometric aging, (termed non fuel-cut aging or RAT aging) were evaluated on the Chevy Lumina. The aging was done on a Chevrolet 7.4 L V-8 engine with a closed loop wide range sensor control and multi-point fuel injection. The aging cycle included a 20 second stoichiometric mode with catalyst bed temperature of 950° C., a six second rich mode (A/F=13.15), a 10 second lean (A/F=14.8) exothermic mode with bed temperature of 1,050° C., and finally a 4 second lean (A/F=16.15) mode with secondary air added.

The fuel cut aging cycle consisted of two modes. The first mode was a 300 second cruise in which the engine operated rich with secondary air injection to give a stoichiometric exhaust gas composition at the catalyst inlet. The second mode was 320 second long and also operated with the engine running rich with secondary air injection, but included a fuel cut every 30 seconds. During the cruise mode the exhaust gas composition was at stoichiometry at the catalyst inlet; the inlet temperature was 675° C. with a bed temperature of 1,000° C.

The light-off and A/F traverse activity measurements were measured on a Ford 5.0 L MPFI (multi-port fuel injection) engine. The engine speed was 1,800 revolutions per minute (RPM) with catalyst inlet CO, $O_2$, $NO_X$, and HC concentrations of 0.62%, 0.6%, 1,800 parts per million (ppm) and 1,900 ppm respectively, wherein percents and parts per million are volumetric percentages. The mean A/F ratio during the test was 14.56 with an A/F oscillation amplitude of ±0.65 A/F units at a frequency of 1.0 hertz (Hz). The temperature ramp was generated by diverting the exhaust through a heat exchanger. The temperature traverse ramp consisted of a ramp from 200° C. to 45°° C. at a rate of 51° C. per minute with a gas hourly space velocity (GHSV) of 35,000 $h^{-1}$, defined as the volume of gas flowing at standard temperature and pressure per geometric volume of catalysts per hour.

The A/F traverse test utilized a catalyst inlet temperature of 400° C. and a GHSV of 35,000 $h^{-1}$. Again, a 5.0 L Ford MPFI engine was used for the test at an engine speed of 1,800 RPM. The traverse test consisted of a continuous A/F sweep from A/F=15.2 to 13.8 at 0.131 A/F units per minute. During the test, the A/F modulation was ±0.65 A/F units at a frequency 1 Hz.

Reference 2-Layer Catalyst, Advanced Reference 2-Layer Catalyst, and 2-Layer A Catalyst A separate washcoat composition was used for the Pd and Rh layers. The method for making the catalyst is described in detail below. The Pd washcoat was applied first followed by calcination and then the Rh washcoat was applied. Different alumina and OS materials were used in the Pd and Rh layers.

For the Pd layer, the alumina used was either a La stabilized gamma alumina (current commercial 2-layer Pd/Rh catalyst, referred to hereinafter as "reference 2-layer catalyst") or a non-stabilized meso-porous gamma alumina (referred to hereinafter as "advanced reference 2-layer catalyst"). The OS material consisted of a higher Ce-containing quaternary OS composite material consisting of Ce, Zr, La, and Pr having the following composition $Ce_{0.376}Zr_{0.50}La_{0.086}Pr_{0.038}O_{1.95}$. The alumina used in the Rh layer was either a delta alumina (reference 2-layer catalyst) or a meso-porous gamma alumina (advanced reference 2-layer catalyst). For the reference 2-layer catalyst the weight ratio of aluminum oxide to OS in the Pd layer was 1.27 and 0.627 in the Rh layer. In the case of the advanced 2-layer catalyst the alumina to OS ratio in the Pd layer was 1.55 and 0.69 in the Rh layer. The total washcoat loading with both layers present was 3.2 g/in³ (about 195 g/l). The total loading of the palladium and rhodium was about 40 g/ft³ (about 1.41 g/l), with a ratio of palladium to rhodium of 5 to 1.

The test 2-layer A catalyst had an outer layer comprising 50 wt % of the washcoat and all of the Rh and an underlayer (between the outer layer and the substrate) comprising the remaining 50 wt % of the 2-layer washcoat and all of the palladium. Thus, both palladium and rhodium were separated into two layers but the total washcoat load and composition was the same as the 1-Layer A catalyst.

In making the layers, a slurry was prepared by first adding nitric acid to water at 1 wt % based on the total solids in the slurry. $BaSO_4$ was then added with stirring followed by the OSC material. The slurry was stirred for 15 minutes and then the alumina was added slowly. After stirring for 30 minutes, sucrose was added at 10 wt % based on solids in the slurry and finally a dispersible boehmite binder was added. The slurry was then milled using as Sweco type mill to a mean particle size of greater than 2 micrometers, 90% of the diameter distribution was 6.0 to 7.0 micrometers and a 100% pass was less than 25 micrometers (i.e., 100% of the particles had a particle size less than 25 micrometers). The slurry was then weighed and the LOI (loss on ignition) was measured at 540° C. to determine the total calcined solids content. Based on this value the Pd and Rh loadings were calculated. Pd nitrate solution was then added to the slurry dropwise while stirring. After the Pd addition the slurry specific gravity was in the range of 1.49 to 1.52, parts were coated by dipping one end of a honeycomb ceramic monolith into the washcoat slurry, followed by drawing the slurry up into the channels using a vacuum. The part was then removed from the slurry and the channels cleared by applying a vacuum to the other end of the part. Washcoat loading was controlled by varying specific gravity, and other coating parameters such as vacuum time and the amount of slurry drawn into the honeycomb channels. After applying the washcoat, the parts were calcined at 540° C. for 2 hours. This process was then repeated for the second layer.

Preparation of the 1-Layer A and 1-Layer B Catalysts:

The methods used in making the 1-layer A catalyst and the 1-layer B catalyst were the same. The 1-layer A catalyst and the 1-layer B catalyst differ only in the oxygen storage component used. More particularly, the 1-layer A used a micro-porous oxygen storage component and the 1-layer B used a meso-porous oxygen storage component.

In making the catalysts, a slurry was prepared by adding $BaSO_4$ to water along with a small amount of $HNO_3$ (i.e., 1 wt % based on the total weight of the slurry). The meso-porous gamma aluminum oxide was then added followed by the OS component and the boehmite binder. During the powder additions, the pH was held constant in the range of 4.9 to 5.2 with $HNO_3$. Sucrose was then added at 10 wt %, based on the total content of solids in the slurry. The slurry was then milled (using a Sweco type mill) such that the minimum particle size was greater than 2.0 micrometers; the 90% distribution was 6.0 to 7.5 micrometers, and 100% pass was less than 35 micrometers (i.e., 100% of the particles had a size less than 35 micrometers). After milling, the slurry was weighed and the loss on ignition (LOI) was measured at 540° C. to determine the calcined dry solid content. Pd was added as a nitrate salt drop wise into a mixing slurry vortex over a time period of 30 minutes. The Rh was added as a sulfite salt in a similar fashion. The slurry was then aged for a minimum of one hour after which it was applied to the ceramic honeycomb monolith as described above. The weight ratio of binder:aluminum oxide:$BaSO_4$:OSC was 1:30:4:18 respectively in the finished calcined washcoat. The total washcoat loading was 3.1 g/in$^3$ (about 195 g/l). The total loading of the palladium and rhodium was about 40 g/ft$^3$ (about 1.41 g/l), with a ratio of palladium to rhodium of 5:1 (i.e., 5 palladium to 1 rhodium). As is clear from this process, no effort was made to separate the precious metals either through pre-impregnation methods, chemical fixation or otherwise.

Figure 2:
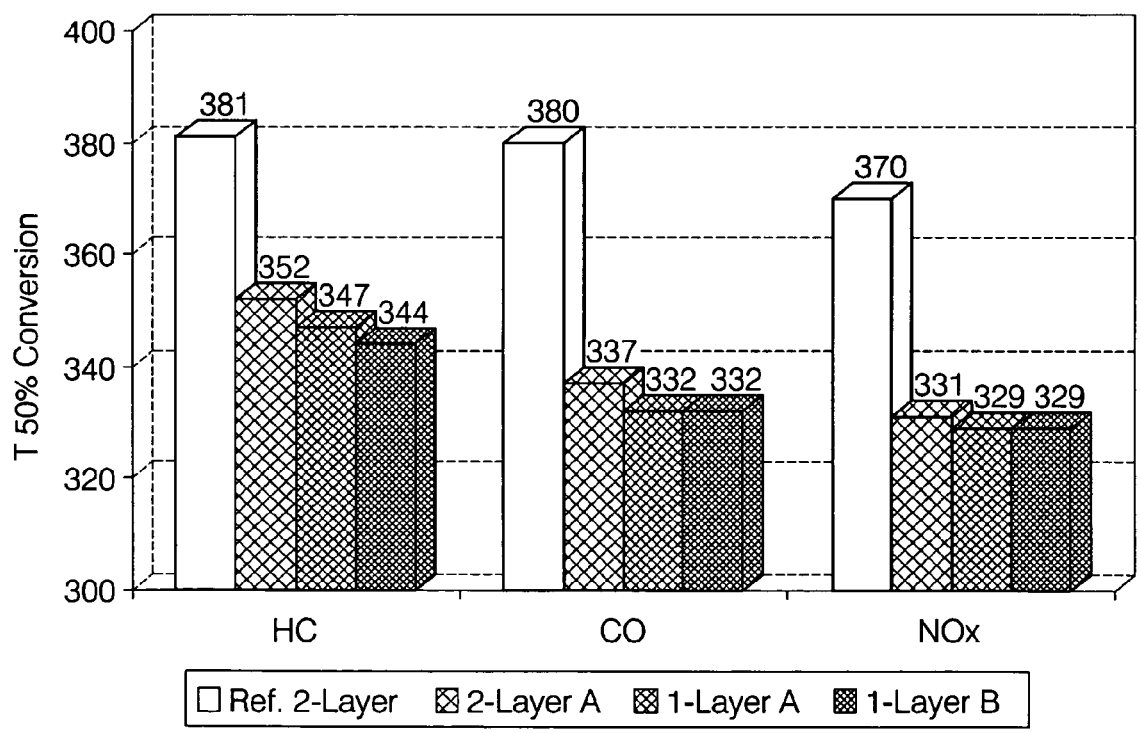
FIG. 2 is a graphical comparison of light-off temperatures of a component (e.g., HC, CO, and $NO_x$) in an exhaust stream obtained with reference 2-layer catalyst, 2-layer A catalyst, 1-layer A catalyst, and 1-layer B catalyst.

FIG. 2 is a graphical comparison of the light-off temperatures in the reference 2-layer catalyst compared to 2-layer A, 1-layer A, and 1-layer B catalysts after aging. The catalysts were aged under hot lean conditions for a period of 100 hours, with a maximum bed temperature of 1,025° C. This aging was run on a Chevy 7.4 L V-8 engine. The cycle consisted of two modes each 300 seconds in length. The first mode consisted of a rich cruise with a catalyst inlet tempertaure of 550° C., a bed temperature of of 575° C., and an exhaust A/F ratio of 11.6. For the second mode, the engine was again run under rich conditions but air was injected at the catalyst inlet such that the A/F ratio seen by the catalyst was 15.3. The catalyst inlet temperature was 475° C. while the bed temperature was 1,025° C.

As can be seen from the bars in the graph, 1-layer A and 1-layer B catalysts had substantially faster light-off than the reference 2-layer catalyst. For example, the reference 2-layer catalyst had a light-off temperature of 370° C. for $NO_X$, while the 1-layer A and 1-layer B both had a light-off temperature of 329° C. for $NO_X$. The light-off temperatures were also lower for the 1-layer A and 1-layer B for HC and CO compared to the reference 2-layer catalyst. Furthermore, test 2-layer A performed similarly to 1-layer A and 1-layer B catalysts. Thus, no significant performance advantages are obtained by separating the precious metals.

Figure 3:
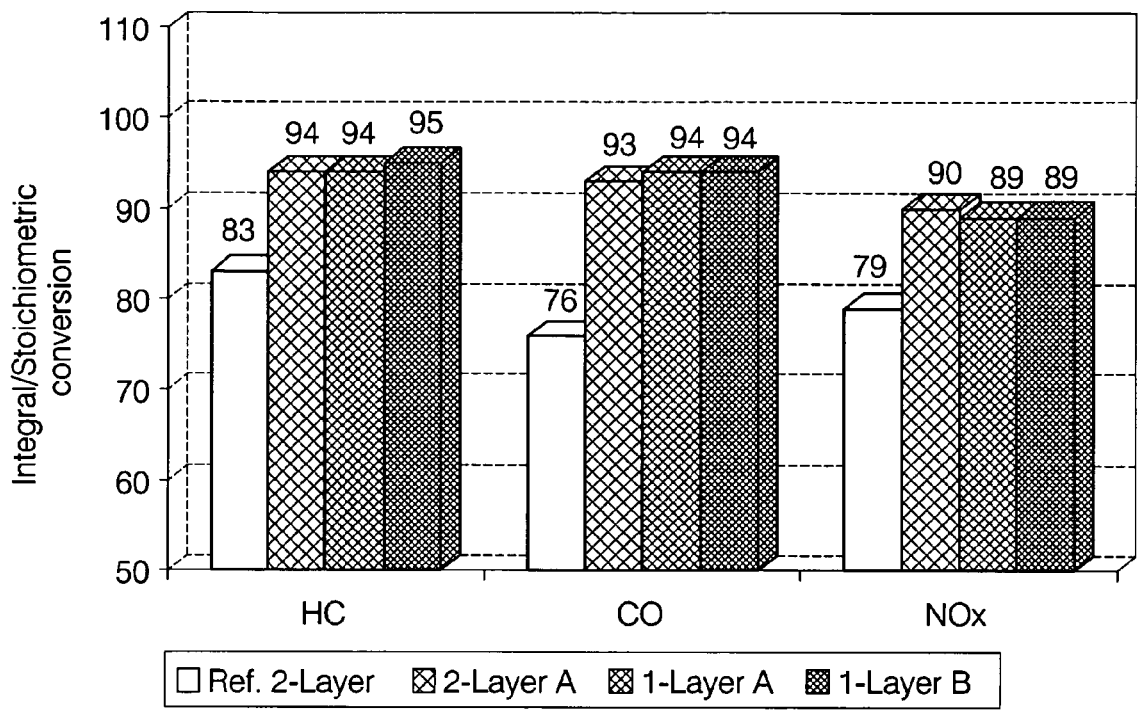
FIG. 3 is a graphical comparision of the integral/stoichiometeric conversion at 400° C. for a component (e.g., HC, CO, and $NO_x$) in an exhaust stream obtained with reference 2-layer catalyst, 2-layer A catalyst, 1-layer A catalyst, and 1-layer B catalyst.

FIG. 3 is a graphical comparision of the integral/stoichiometeric conversion at 400° C. for the reference 2-layer catalyst compared to 2-layer A, 1-layer A and 1-layer B catalysts. The catalysts were aged under hot lean conditions for a period of 100 hours, with a maximum bed temperature of 1,025° C. As can be seen from the bars, the 1-layer A and 1-layer B had improved conversions compared to the reference 2-layer catalyst. For example, 1-layer A and 1-layer B both had a conversion of 89% for $NO_X$, whereas the reference 2-layer catalyst had a conversion of 79% for $NO_X$. Similar improvements in conversion were also observed for HC and CO. More particularly, 1-layer A and 1-layer B catalysts obtained conversions greater than or equal to 89% for HC, CO, and $NO_X$.

Figure 4:
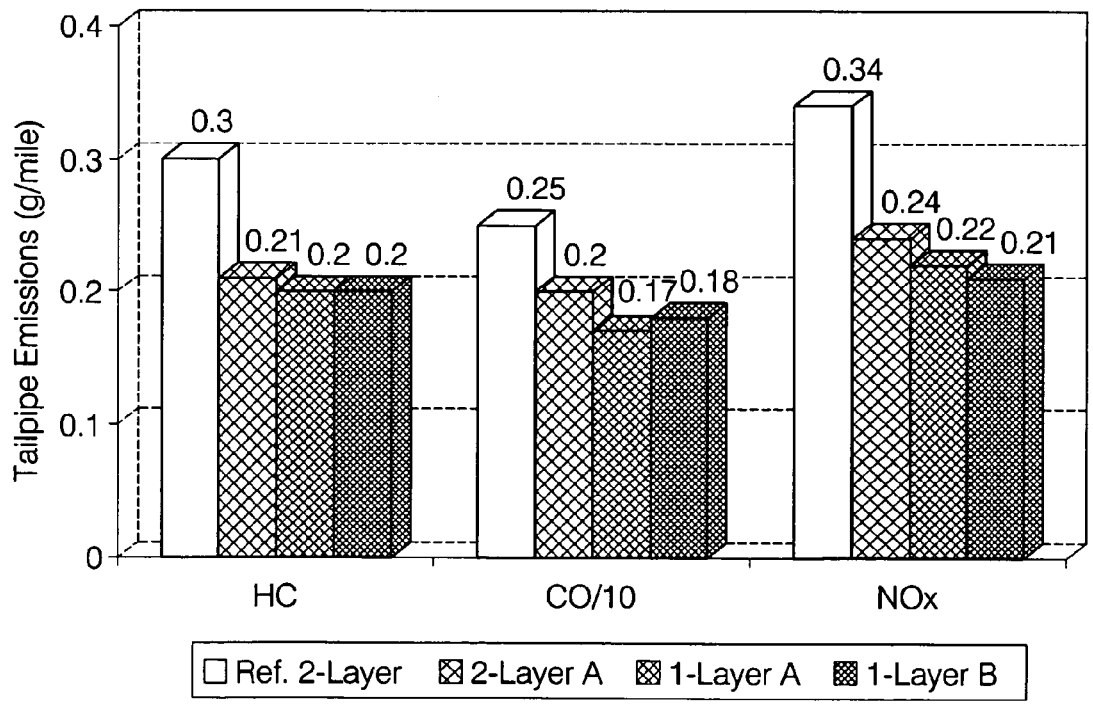
FIG. 4 is a graphical comparison of tailpipe emissions (grams per mile (g/mile)) for a component (e.g., HC, CO, and $NO_x$) in an exhaust stream obtained with reference 2-layer catalyst, 2-layer A catalyst, 1-layer A catalyst, and 1-layer B catalyst.

FIG. 4 is a graphical comparison of tailpipe emissions (grams per mile (g/mile)) for a component (e.g., HC, CO, $NO_X$) in an exhaust stream for reference 2-layer catalyst compared to 2-layer A, 1-layer A, and 1-layer B catalysts. The catalysts were aged under hot lean conditions for a period of 100 hours, with a maximum bed temperature of about 1,025° C. The test was an FTP test, measured the mass of pollutants in the exhaust gas—HC, CO and $NO_X$. These pollutants are measured while simulating a typical trip in city driving. It involves a series of starts, stops, idles, accelerations, and decelerations, at varying speeds and rates. Testing is done on a dynamometer with a horsepower load based on the size and weight of the vehicle. During the test the tailpipe and engine out emissions are collected and measured and the emissions are integrated over the complete cycle. In this example, the reference 2-layer catalyst had a higher tail pipe emission for every exhaust component compared to the 1-layer A and 1-layer B catalysts. For example, 1-layer A catalyst had a $NO_X$ emission 0.22 grams per mile (g/mile); 1-layer B catalyst had a $NO_X$ emission 0.21 g/mile; and the reference 2-layer catalyst had a $NO_X$ emission 0.34 g/mile. Thus, the reference 2-layer catalyst emitted more grams of pollutant per mile compared to 1-layer A and 1-layer B catalyst. As noted above, the 2-layer A catalyst performed similarly to 1-layer A and 1-layer B catalysts. However, the 1-layer A and 1-layer B catalysts have the advantage of a more simple catalyst design, which relates to a lower costing catalyst.

Figure 5:
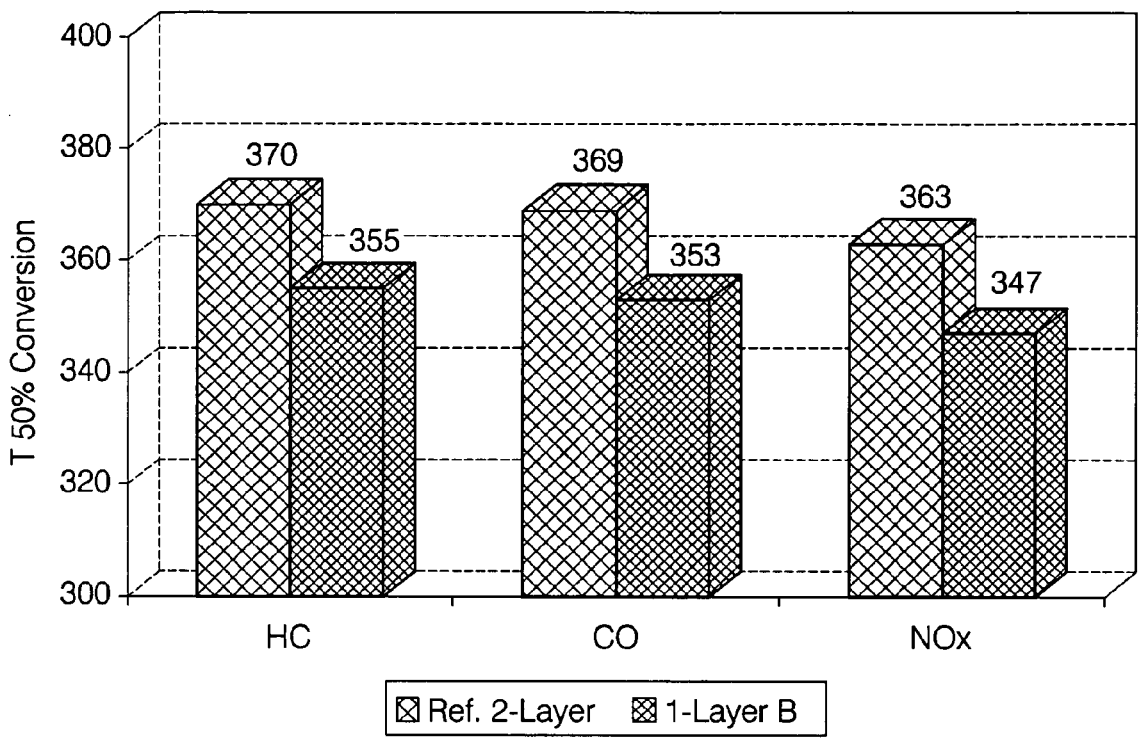
FIG. 5 is a graphical comparison of light-off temperatures for exhaust stream components (e.g., HC, CO, and $NO_x$) obtained with reference 2-layer catalyst and 1-layer B catalyst.

FIG. 5 is a graphical comparison of the temperatures at which 50% conversion of a component (e.g., HC, CO, $NO_X$)

is obtained for reference 2-layer catalyst and compared to 1-layer B. The catalysts were aged under RAT conditions for a period of 100 hours, with a maximum bed temperature of about 1050° C. This example is included to show that the 1-layer B catalyst, even after aging in exhuast conditions that favor alloy formation between Pd and Rh (e.g., operating at both rich and stoichiometric exhaust conditions at termperatures greater than 700° C.), did not form an alloy. This was determined by comparing the reference 2-layer catalyst to the 1-layer B catalyst. In the reference 2-layer catalyst, the Pd and Rh are on separate layers, as such they did not form an alloy. When Pd and Rh alloy, the Rh fuction of the catalyst is generally lost. As such, one would expect a higher $T_{50\%}$ for the $NO_X$ in the 1-layer B catalyst compared to the reference 2-layer catalyst. This was not the case, however. Actually, $T_{50\%}$ for the $NO_X$ component was lower in the 1-layer B catalyst. More particularly, $T_{50\%}$ for $NO_X$ in the reference 2-layer catalyst was 363° C. and $T_{50}\%$ for $NO_X$ in the reference 1-layer B catalyst was 347° C. As such, alloy formation was effectively prevented, and HC and CO light-off temperatures of less than or equal to 360° C. and a $NO_X$ light-off temperature of less than or equal to 350° C. were attained.

Figure 6:
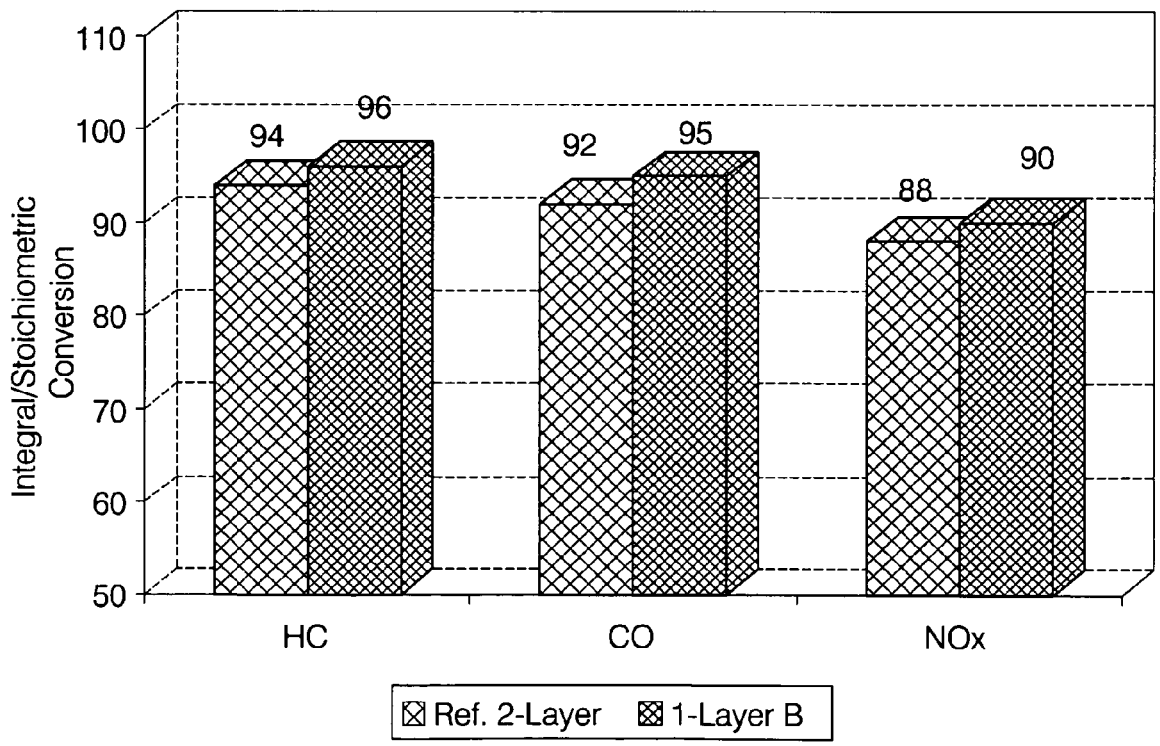
FIG. 6 is a graphical comparison of the integral/stoichiometeric conversion at 400° C. for a component (e.g., HC, CO, and $NO_x$) in an exhaust stream obtained with reference 2-layer catalyst and 1-layer B catalyst.

FIG. 6 is a graphical comparison of the integral/stoichiometeric conversion at 400° C. for a component (e.g., HC, CO, $NO_X$) in the exhaust stream for reference 2-layer catalyst compared to the 1-layer B catalyst. The catalysts were aged under non-fuel cut aging conditions for a period of 100 hours, with a maximum bed temperature of about 1050° C. This example shows that greater than 89% conversion of each exhaust component was obtained for the 1-layer B catalyst. This was slightly better than the reference 2-layer catalyst. This Figure, like FIG. 5, illustrates that the Pd and Rh did not form an alloy. If the Pd and Rd had formed an alloy, the conversions would have been lower than the reference 2-layer catalyst, while they were actually slightly higher. The absence of alloy formation was verified using detailed x-ray diffraction (XRD) analysis of the washcoats for these catalysts after aging.

Figure 7:
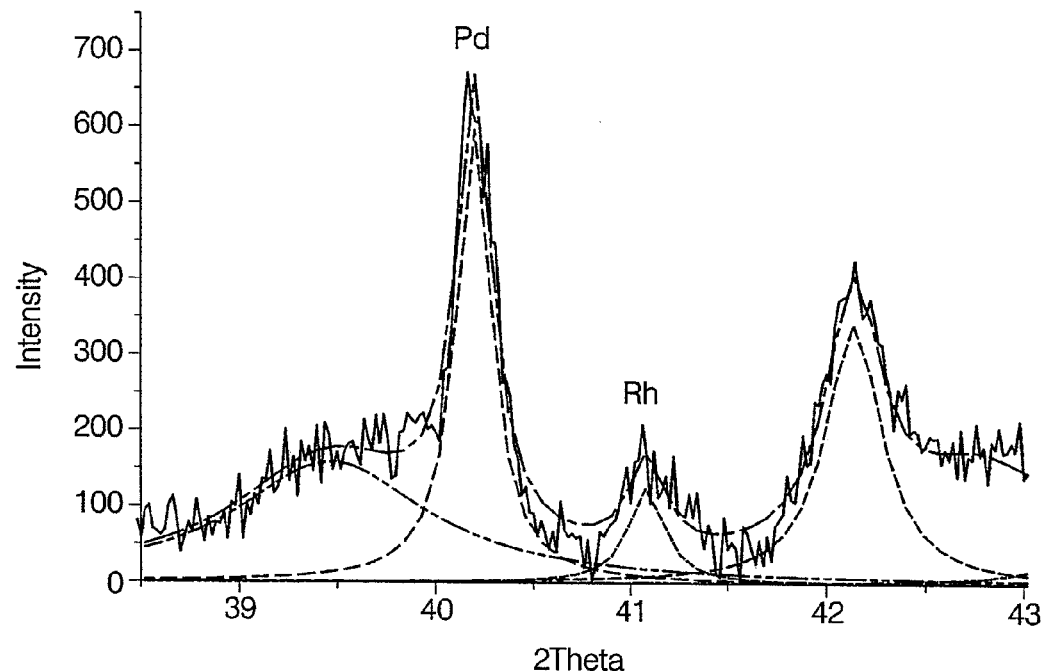
FIG. 7 is an x-ray diffraction (XRD) pattern for the reference 2-layer catalyst.
Figure 8:
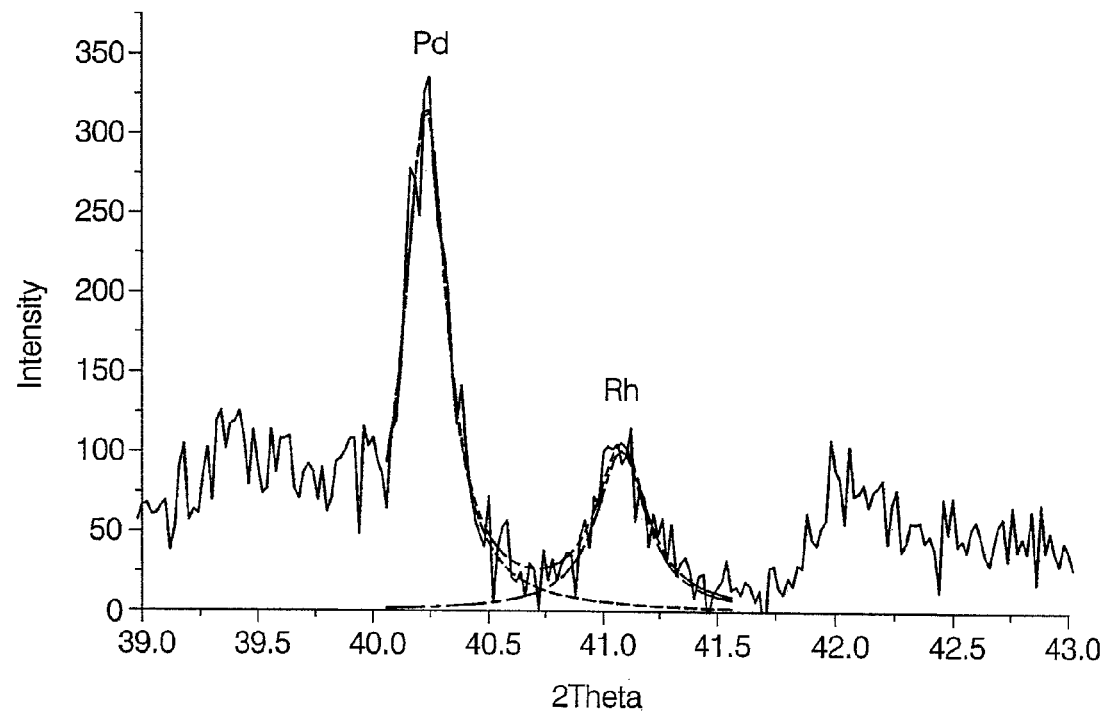
FIG. 8 is an XRD pattern for the 1-layer B catalyst.

FIGS. 7 and 8, respectively, show the XRD patterns of the reference 2-layer catalyst, and 1-layer B catalyst in the 2 theta range of 38.5-43° which encompasses the diffraction peaks associated with the (111) reflection of Pd metal centered at 40.2° and the (111) reflection of Rh metal centered at 41.1°. If alloy formation occurred between the Pd and Rh a single broad peak would be located between the peak position for the pure Pd and Rh metals. It is seen that even in the case of the 1-layer B catalyst (where both Pd and Rh were added to the slurry before coating) that there is no indication of alloy formation between the Pd and Rh.

Figure 9:
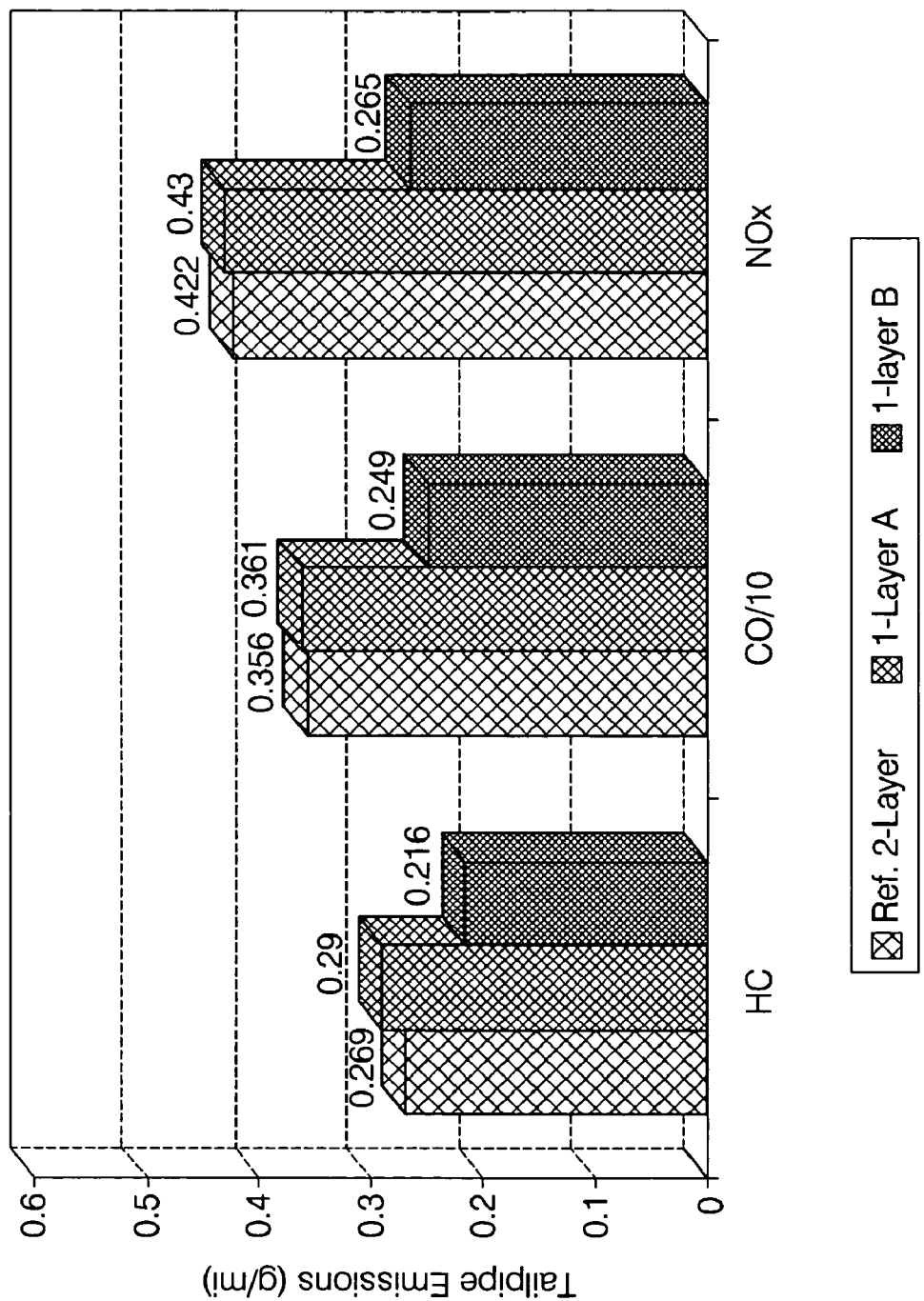
FIG. 9 is a graphical comparison of tailpipe emissions for a component (e.g., HC, CO, or $NO_x$) in an exhaust stream obtained with reference 2-layer catalyst, 1-layer A catalyst, and 1-layer B catalyst.

FIG. 9 is a graphical comparison of tailpipe emissions (grams per mile (g/mile)) for a component (e.g., HC, CO, and $NO_X$) in an exhaust stream for a reference 2-layer catalyst, a 1-layer A catalyst, and a 1-layer B catalyst. The aging was a high temperature fuel cut type, with a maximum bed temperature of 1,000° C. No performance penalties were observed for the 1-layer catalyst designs. Moroever, this Figure shows that the 1-layer B design has clear performance advantages, in particular for $NO_X$ performance. More particularly, the reference 2-layer had a $NO_X$ emission of 0.422 g/mile, while the 1-layer B catalyst had a $NO_X$ emission of 0.265 g/mile; greater than a 35% reduction in $NO_X$ emissions.

Figure 10:
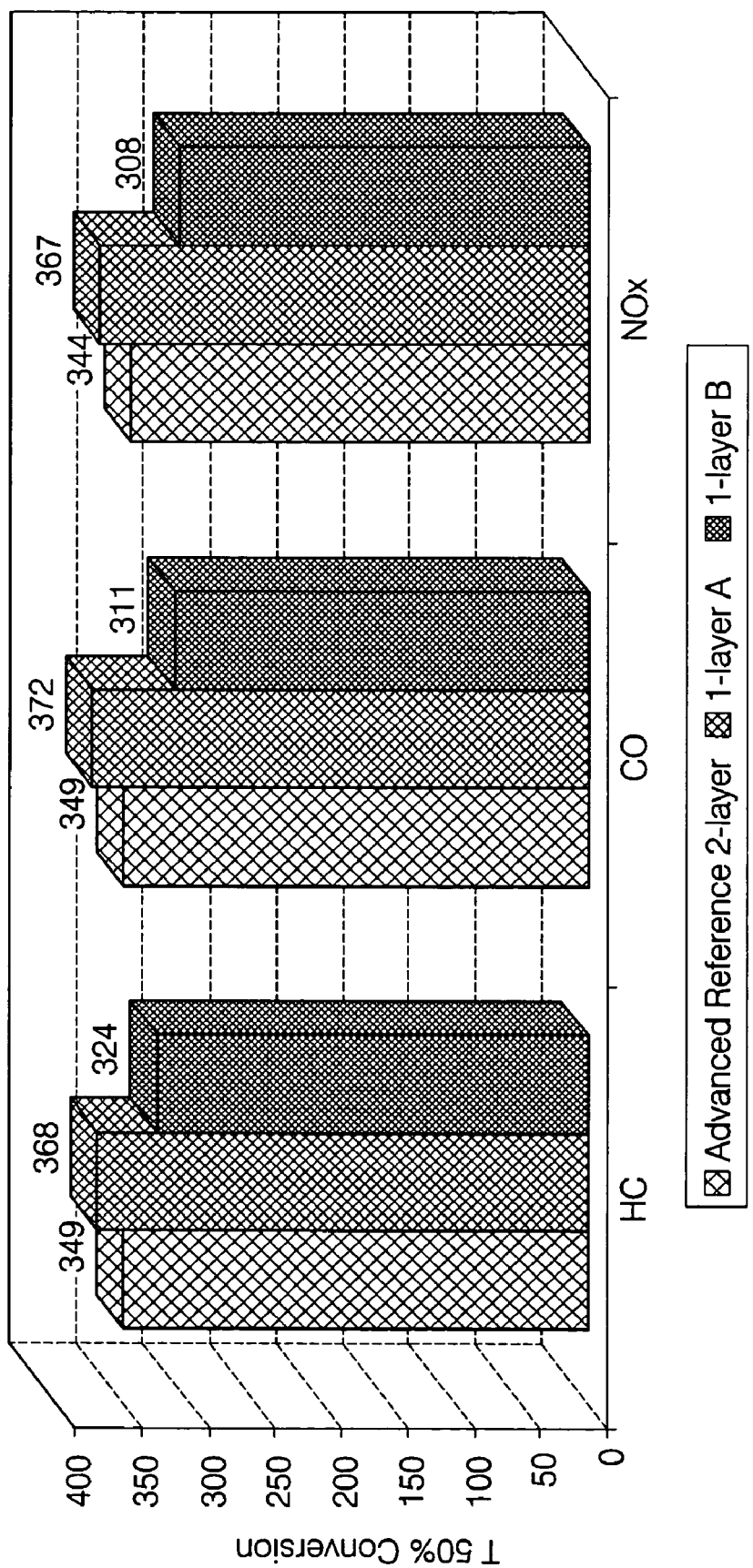
FIG. 10 is a graphical comparison of light-off performance obtained with advanced reference 2-layer catalyst, 1-layer A catalyst, and 1-layer B catalyst.

FIG. 10 is a graphical comparison of light-off performance for an advanced reference 2-layer catalyst compared to the 1-layer A and 1-layer B catalysts. This figure shows that 1-layer B catalyst even performed better than the advanced 2-layer design.

There are numerous advantages associated with the single layer Pd/Rh catalyst. This catalyst simplifies manufacturing and reduces costs while maintaining performance. Further, since the Pd component is now in more direct contact with the exhaust stream, higher performance can be achieved as the Rh layer is not acting as a barrier to exhaust contact with Pd. It is understood that this mixed layer of Pd/Rh can be employed with other catalyst layers. Unlike prior 2 layer designs where the Pd and Rh were in separate layers, here the Pd and Rh are in a single layer and other catalyst layers may optionally be employed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An exhaust treatment device, comprising:
 a substrate having thereon a 1- catalyst layer, which comprises a homogenous mixture of a first catalyst metal and a second catalyst metal, which are each deposited as a combined loading, in the absence of selective placement, on both an aluminum oxide and an oxygen storage component,
 wherein greater than or equal to about 70 wt % of the first catalyst metal and the second catalyst metal is non-alloyed, wherein the weight percent is based on a combined weight of the first catalyst metal and the second catalyst metal; and
 wherein the first catalyst metal and the second catalyst metal are different and individually selected from the group consisting of platinum, palladium, rhodium, iridium, rhenium, ruthenium, and osmium,
 wherein the aluminum oxide and the storage component are both meso-porous having average pore diameters of about 150 Å to about 1000 Å, wherein about 50% to about 80% of the pore volume, based on the total pore volume, comprise pores having average pore diameters of about 180 Å to about 800 Å, and
 wherein the oxygen storage component has a stable cubic structure and is represented by the formula $(Ce_aZr_bLa_cY_dPr_eO_x)$, wherein subscripts a, b, c, d, e, and x, represent atomic fractions, and wherein a+b+c+d+e=1.

2. The exhaust treatment device of claim 1, wherein the first catalyst metal is palladium and the second catalyst metal is rhodium.

3. The exhaust treatment device of claim 2, wherein greater than 90wt % of the first catalyst metal and the second catalyst metal is non-alloyed.

4. The exhaust treatment device of claim 3, wherein greater than 95wt % of the first catalyst metal and the second catalyst metal is non-alloyed.

5. The exhaust treatment device of claim 2, wherein a weight ratio of the palladium to the rhodium is less than or equal to about 20:1.

6. The exhaust treatment device of claim 5, wherein the ratio is about 3:1 to about 15:1.

7. The exhaust treatment device of claim 1, wherein the aluminum oxide comprises gamma aluminum oxide.

8. The exhaust treatment device of claim 1, wherein the oxygen storage component comprises $Ce_{0.376}Zr_{0.50}La_{0.086}Pr_{0.038}O_{1.95}$ or $Ce_{0.25}Zr_{0.65}La_{0.04}Y_{0.06}O_{1.95}$.

9. A method of making an exhaust emission control device, including a substrate having thereon a 1-catalyst layer, which comprises a homogenous mixture of a first catalyst metal, a second catalyst metal, an aluminum oxide, and an oxygen storage component,
    wherein greater than or equal to about 70 wt % of the first catalyst metal and the second catalyst metal is non-alloyed, wherein the weight percent is based on a combined weight of the first catalyst metal and the second catalyst metal;
    wherein the first catalyst metal and the second catalyst metal are different and individually selected from the group consisting of platinum, palladium, rhodium, iridium, rhenium, ruthenium, and osmium,
    the method comprising:
    forming a slurry by sequentially depositing the first catalyst metal and the second catalyst metal, each as a combined loading, in the absence of selective placement, on both the aluminum oxide and the oxygen storage component, wherein the aluminum oxide and the oxygen storage component are both meso-porous having average pore diameters of about 150 Å to about 1,000 Å, wherein about 50% to about 80% of the pore volume, based on the total pore volume, comprise pores having average pore diameters of about 180 Å to about 800 Å, and wherein the oxygen storage component has a stable cubic structure and is represented by the formula $(Ce_aZr_bLa_cY_dPr_eO_x)$, wherein subscripts a, b, c, d, e, and x, represent atomic fractions, and wherein a+b+c+d+e=1,
    depositing the slurry on a substrate to form a washcoated substrate; and
    calcining the washcoat plus substrate to form a catalyst layer on the substrate, wherein greater than or equal to about 70 wt % of the palladium and rhodium in the catalyst layer is non-alloyed under alloying conditions, wherein the weight percent is based on a total weight of the first catalyst metal and the second catalyst metal in the catalyst.

10. The method of claim 9, wherein greater than 95 wt % of the first catalyst metal and the second catalyst metal is non-alloyed.

11. The method of claim 9, wherein a weight ratio of the palladium to the rhodium is less than or equal to about 20:1.

12. The method of claim 11, wherein the ratio is about 3:1 to about 15:1.

13. The method of claim 9, wherein the aluminum oxide comprises gamma aluminum oxide.

14. The method of claim 9, wherein the oxygen storage component comprises $Ce_{0.376}Zr_{0.50}La_{0.086}Pr_{0.038}O_{1.95}$ or $Ce_{0.25}Zr_{0.65}La_{0.04}Y_{0.06}O_{1.95}$.

15. The method of claim 9, wherein the oxygen storage component has a stable cubic structure.

16. The exhaust treatment device of claim 1,
    wherein the first catalyst metal is palladium and the second catalyst metal is rhodium and a is from 0.01 to 0.6, and the exhaust treatment device further comprises
    a retention material disposed around the substrate to form a subassembly; and
    a housing disposed around the subassembly.

17. The exhaust treatment device of claim 1, wherein:
    a has a value of about 0.01 to about 0.6;
    b has a value of less than or equal to about 0.95;
    c has a value of less than or equal to about 0.15;
    d has a value of less than or equal to about 0.15;
    e has a value of less than or equal to about 0.15; and
    x has a value less than or equal to about 2.0.

18. The exhaust treatment device of claim 1,
    wherein a ranges from 0.01 to 0.6.

19. The exhaust treatment device of claim 1,
    wherein the first catalyst metal is palladium and the second catalyst metal is rhodium
    and the homogenous mixture further comprises a palladium salt and a rhodium salt.

* * * * *